(12) United States Patent
Malakhova et al.

(10) Patent No.: US 7,417,332 B2
(45) Date of Patent: Aug. 26, 2008

(54) METHOD AND APPARATUS OF MONITORING A MACHINE

(75) Inventors: Olga Malakhova, Minden, NV (US); John Wesley Grant, Gardnerville, NV (US); James Joseph Schmid, Kirkland, WA (US); Timothy J. Clark, Minden, NV (US)

(73) Assignee: General Electric Company, Schenectady, NY (US)

( * ) Notice: Subject to any disclaimer, the term of this patent is extended or adjusted under 35 U.S.C. 154(b) by 145 days.

(21) Appl. No.: 11/467,010

(22) Filed: Aug. 24, 2006

(65) Prior Publication Data

US 2008/0069693 A1 Mar. 20, 2008

(51) Int. Cl.
*F03D 13/00* (2006.01)

(52) U.S. Cl. .......................................... 290/44; 290/55
(58) Field of Classification Search ................... 290/43, 290/44, 54, 55
See application file for complete search history.

(56) References Cited

U.S. PATENT DOCUMENTS

| | | | |
|---|---|---|---|
| 5,083,039 A * | 1/1992 | Richardson et al. | 290/44 |
| 5,109,700 A | 5/1992 | Hicho | |
| 5,115,671 A | 5/1992 | Hicho | |
| 5,629,567 A * | 5/1997 | Kumar | 290/3 |
| 5,663,600 A * | 9/1997 | Baek et al. | 290/55 |
| 5,744,723 A | 4/1998 | Piety | |
| 5,798,631 A * | 8/1998 | Spee et al. | 322/25 |
| 6,320,272 B1 * | 11/2001 | Lading et al. | 290/44 |
| 6,567,709 B1 | 5/2003 | Malm et al. | |
| 6,608,397 B2 * | 8/2003 | Makino et al. | 290/44 |
| 6,720,670 B2 * | 4/2004 | Makino et al. | 290/55 |
| 7,095,129 B2 * | 8/2006 | Moroz | 290/44 |
| 7,183,664 B2 * | 2/2007 | McClintic | 290/55 |
| 7,227,274 B2 * | 6/2007 | Berkson | 290/40 R |
| 7,281,891 B2 * | 10/2007 | Smith et al. | 415/4.3 |
| 7,321,221 B2 * | 1/2008 | Bucker et al. | 322/44 |
| 2005/0209814 A1 | 9/2005 | Song | |

* cited by examiner

*Primary Examiner*—Nicholas Ponomarenko
(74) *Attorney, Agent, or Firm*—Armstrong Teasdale LLP

(57) ABSTRACT

A monitoring system for a machine is provided. The machine includes at least one movable member including at least one sensor configured to generate at least one speed measurement of the moveable member. The machine also includes at least one processor coupled in electronic data communication to the sensor. The sensor is configured to generate at least one time stamp value for the at least one speed measurement signal. The at least one processor is configured to generate a plurality of time-stamped speed measurement signals of the at least one moveable member. The processor is further configured to determine a prioritization of the plurality of time-stamped speed measurement signals as a function of at least one predetermined temporal value.

7 Claims, 6 Drawing Sheets

METHOD AND APPARATUS OF MONITORING A MACHINE

BACKGROUND OF THE INTENTION

This invention relates generally to machines and more particularly, to methods and apparatus for monitoring wind turbines.

Generally, a wind turbine generator includes a turbine that has a rotatable hub assembly including multiple blades. The hub assembly is coupled to a rotor and the blades transform mechanical wind energy into a mechanical rotational torque that drives one or more generators via the rotor. The generators are generally, but not always, rotationally coupled to the rotor through a gearbox. The gearbox steps up the inherently low rotational speed of the rotor to enable the generator to efficiently convert the rotational mechanical energy into electrical energy that is supplied to a utility grid. Gearless direct drive wind turbine generators also exist. Generally, the rotor, generator, gearbox and other components are mounted within a housing or nacelle, that is positioned atop a base, such as truss, lattice or tubular tower.

Some known wind turbines include vibration monitoring systems that record, transmit, and analyze data that includes, but is not limited to, component speed and vibration data. Generally, component speed and vibration data form an inter-relationship that facilitates analysis of a component at a particular time. Therefore, recording component speed and vibration data, while mitigating a time differential between the two, facilitates component analysis. However, at least some known vibration monitoring systems are not configured to record, transmit, and/or process component speed and vibration data simultaneously and as such, may need to utilize component speed and vibration data recorded at differing times.

BRIEF DESCRIPTION OF THE INVENTION

In one aspect, a monitoring system for a machine is provided. The machine includes at least one movable member including at least one sensor configured to generate at least one speed measurement signal of the moveable member. The machine also includes at least one processor coupled in electronic data communication to the sensor. The sensor is configured to generate at least one time-stamp value for the at least one speed measurement signal. The at least one processor is configured to generate a plurality of time-stamped speed measurement signals of the at least one moveable member. The processor is further configured to determine a prioritization of the plurality of time-stamped speed measurement signals as a function of the at least one predetermined temporal value.

In a further aspect, a method of monitoring a machine is provided. The machine includes at least one moveable member, and a monitoring system including at least one sensor and at least one processor coupled in electronic data communication with the at least one sensor. The method includes receiving a plurality of speed measurement signals within the processor from the at least one sensor, assigning a time-stamp value to each of the plurality of speed measurement signals via the processor to generate a plurality of time-stamped speed measurement signals, determining a prioritization of the plurality of time-stamped speed measurement signals within the processor, and transmitting at least one prioritized time-stamped speed measurement signal.

In a further aspect, a wind turbine generator is provided. The wind turbine generator includes at least one rotatable member, and a monitoring system. The monitoring system includes at least one sensor configured to generate at least one speed measurement of the moveable member. The at least one processor is coupled in electronic data communication to the sensor. The sensor is configured to generate a time stamp value for the at least one speed measurement signal such that the at least one processor is configured to generate a plurality of time-stamped speed measurement signals of the at least one moveable member. The processor is further configured to determine a prioritization of the plurality of time-stamped speed measurement signals.

DETAILED DESCRIPTION OF THE INVENTION

Figure 1:
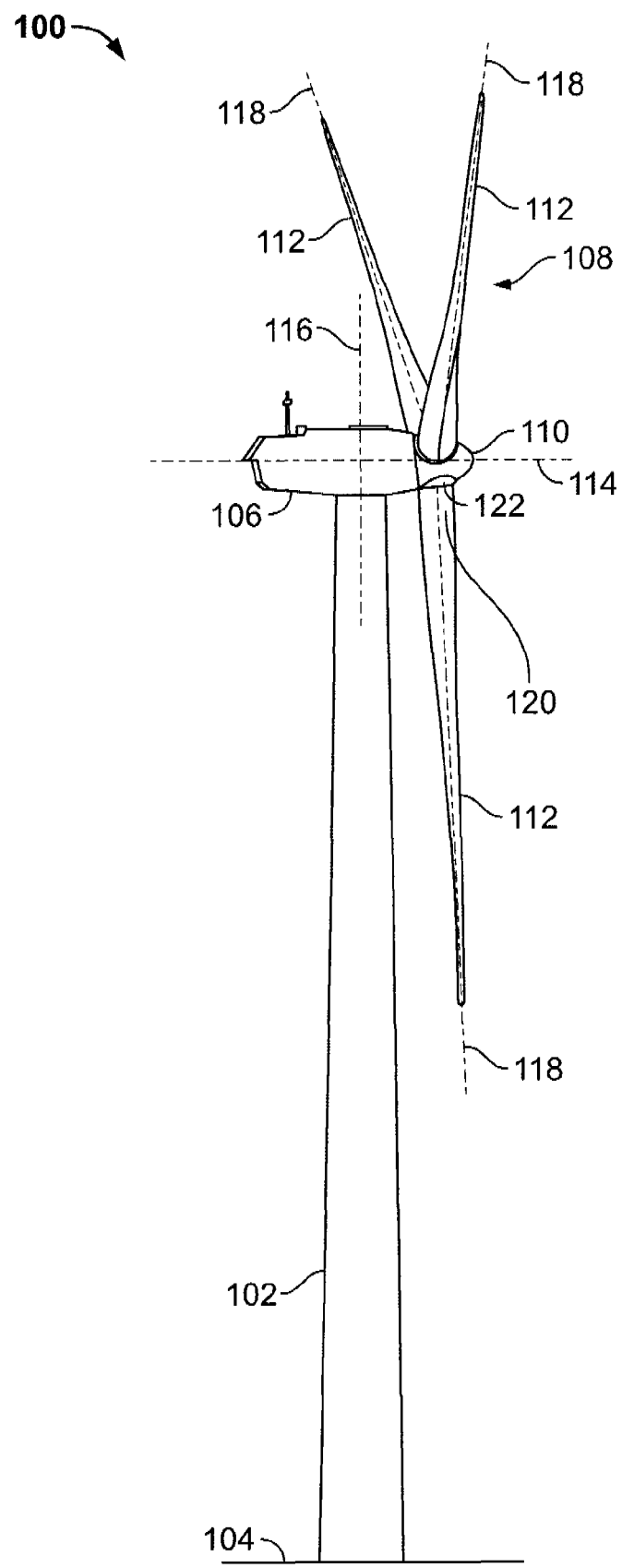
FIG. 1 is a schematic view of an exemplary wind turbine generator.

FIG. 1 is a schematic illustration of an exemplary wind turbine generator 100. In the exemplary embodiment, wind turbine generator 100 is a horizontal axis wind turbine. In the exemplary embodiment, wind turbine generator 100 is a 1.5 megawatt (MW) series wind turbine generator 100 commercially available from General Electric, Schenectady, N.Y. Alternatively, wind turbine 100 may be a vertical axis wind turbine. Wind turbine 100 has a tower 102 extending from a supporting surface 104, a nacelle 106 mounted on tower 102, and a rotor 108 coupled to nacelle 106. Rotor 108 has a rotatable hub 110 and a plurality of rotor blades 112 coupled to hub 110.

In the exemplary embodiment, rotor 108 has three rotor blades 112. In an alternative embodiment, rotor 108 may have more or less than three rotor blades 112. In the exemplary embodiment, tower 102 is fabricated from tubular steel and has a cavity (not shown in FIG. 1) extending between supporting surface 104 and nacelle 106. In an alternate embodiment, tower 102 is a lattice tower. A height of tower 102 is selected based upon factors and conditions known in the art.

Blades 112 are positioned about rotor hub 110 to facilitate rotating rotor 108 to transfer kinetic energy from the wind into usable mechanical energy, and subsequently, electrical energy. Blades 112 are mated to hub 110 by coupling a blade root portion 120 to hub 110 at a plurality of load transfer regions 122. Load transfer regions 122 have a hub load transfer region and a blade load transfer region (both not shown in FIG. 1). Loads induced in blades 112 are transferred to hub 110 via load transfer regions 122.

In the exemplary embodiment, blades 112 have a length between 50 meters (m) (164 feet (ft)) and 100 m (328 ft). Alternatively, blades 112 may have a length greater than 100 m (328 ft) or less than 50 m (164 ft). As the wind strikes blades 112, rotor 108 is rotated about rotation axis 114. As blades 112 are rotated and subjected to centrifugal forces, blades 112 are also subjected to various bending moments and other operational stresses. As such, blades 112 may deflect and/or rotate from a neutral, or non-deflected, position to a deflected position and associated stresses, or loads, may be induced in blades 112. Moreover, a pitch angle of blades 112, i.e., the angle that determines blades 112 perspective with respect to the direction of the wind, may be changed by a pitch adjustment mechanism (not shown in FIG. 1) to facilitate increasing or decreasing blade 112 speed by adjusting the surface area of blades 112 exposed to the wind force vectors. Pitch axes 118 for blades 112 are illustrated. In the exemplary embodiment, the pitches of blades 112 are controlled individually. Alternatively, blades 112 pitch may be controlled as a group.

In some configurations, one or more microcontrollers in a control system (not shown in FIG. 1) are used for overall system monitoring and control including pitch and rotor speed regulation, yaw drive and yaw brake application, and fault monitoring. Alternatively, distributed or centralized control architectures are used in alternate embodiments of wind turbine 100.

Figure 2:
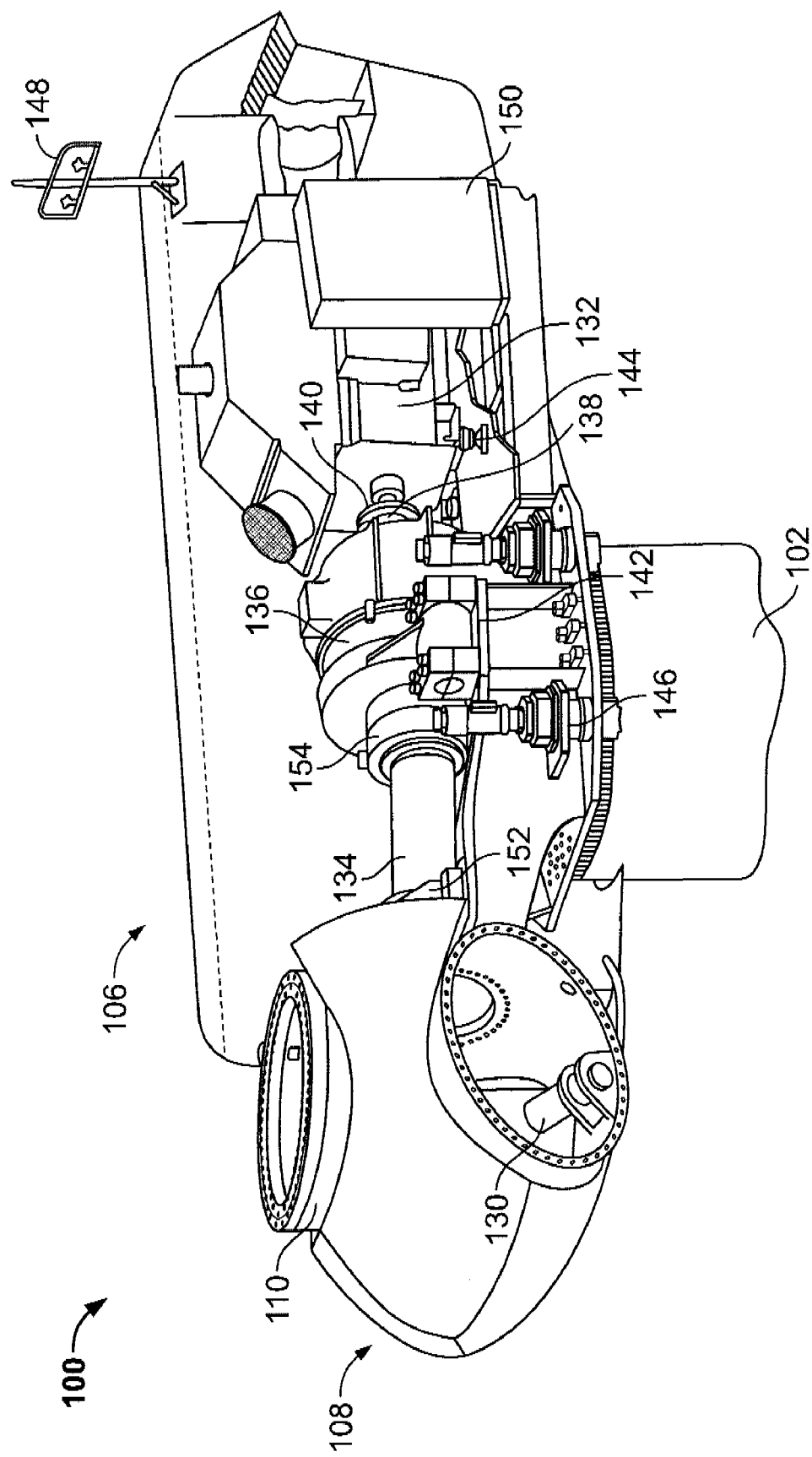
FIG. 2 is a fragmentary perspective view, partly in section, of an exemplary nacelle that may be used with the wind turbine generator shown in FIG. 1.

FIG. 2 is a fragmentary perspective view, partly in section, of an exemplary nacelle 106 that may be used with wind turbine generator 100 (shown in FIG. 1). Various components of wind turbine 100 are housed in nacelle 106 atop tower 102. Pitch drive mechanisms 130 (only one illustrated in FIG. 2) modulate the pitch of blades 112 along pitch axis 118 (both shown in FIG. 1).

Generally, rotor 108 is rotatably coupled to an electric generator 132 positioned within nacelle 106 via rotor shaft 134 (sometimes referred to as low-speed shaft 134), a gearbox 136, a high-speed shaft 138, and a coupling 140. Rotation of shaft 134 rotates gearbox 136 that subsequently rotates shaft 138. Shaft 138 rotates generator 132 via coupling 140 and shaft 138 rotation facilitates production of electrical power within generator 132. Gearbox 136 and generator 132 are supported by support members 142 and 144, respectively.

A yaw adjustment mechanism 146 is also positioned in nacelle 106 and may be used to rotate nacelle 106 and rotor 108 about axis 116 (shown in FIG. 1) to facilitate controlling the perspective of wind turbine 100 with respect to the direction of the wind. Control mechanism 146 is coupled to nacelle 106, and a meteorological mast 148 includes a wind vane and anemometer (neither shown in FIG. 2). Mast 148 is positioned on nacelle 106 and provides information to the turbine control system that may include wind direction and/or wind speed. A portion of the turbine control system resides within a control panel 150.

A main bearing 152 is positioned within and is supported by nacelle 106. Bearing 152 facilitates radial support and alignment of shaft 134. Shaft 134 is rotatably coupled to gearbox 136 via a coupling 154.

Figure 3:
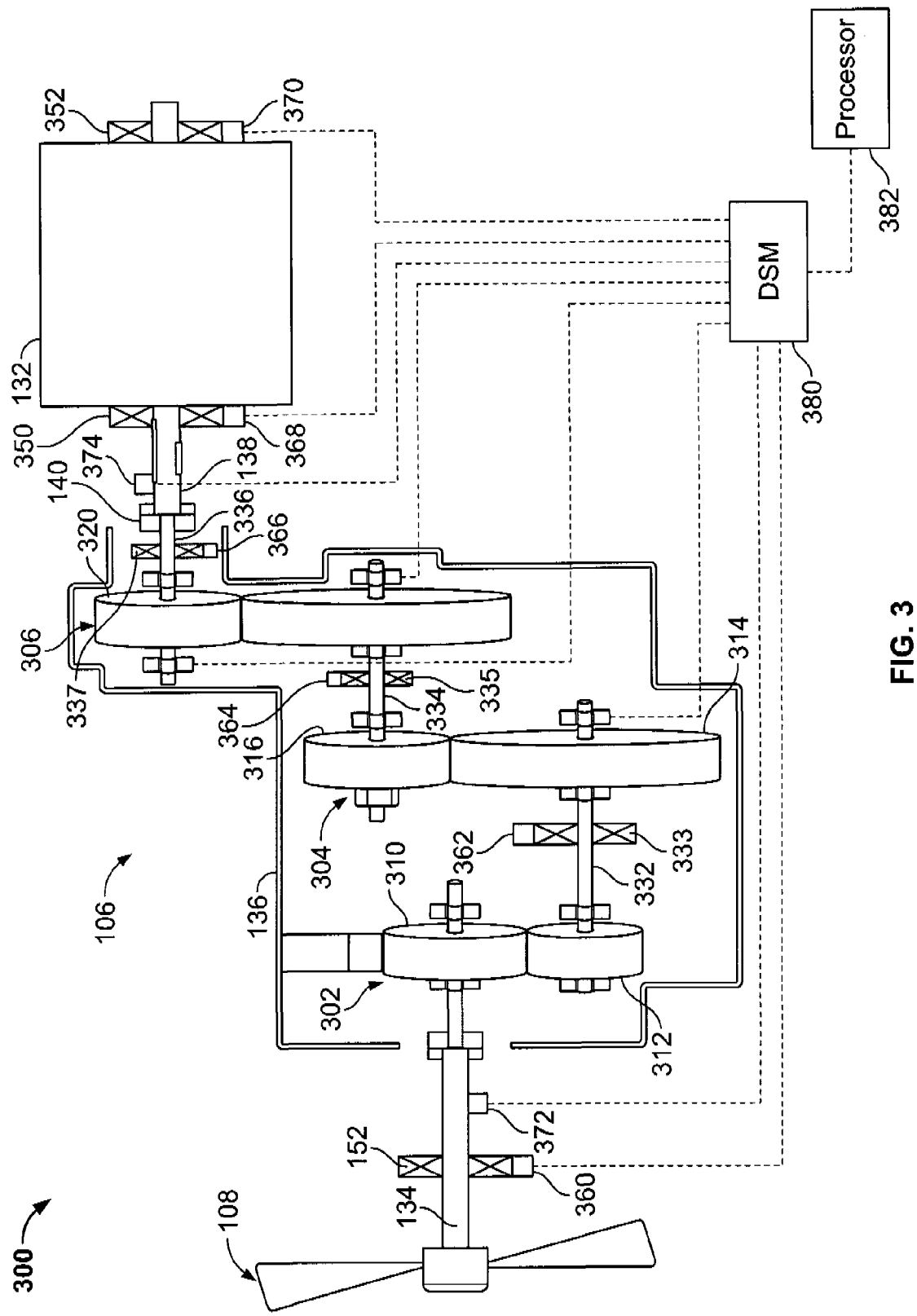
FIG. 3 is a schematic view of an exemplary vibration monitoring system that may be used with the wind turbine shown in FIG. 1.

FIG. 3 is a schematic view of an exemplary vibration monitoring system 300 that may be used with wind turbine 100 (shown in FIG. 1). In the exemplary embodiment, gearbox 136 includes three gear assemblies and utilizes a dual path geometry to drive high-speed shaft 138 as discussed further below. Alternatively, gearbox 136 has any configuration that facilitates operation of wind turbine 100 as described herein. Further, alternatively, wind turbine 100 has a direct-drive configuration, i.e., main rotor shaft 134 is coupled directly to generator 132 via coupling 140 and system 300 is configured to monitor other components of wind turbine 100. Generally, rotation of shaft 134 rotates gearbox 136 that subsequently rotates shaft 138. More specifically, in the exemplary embodiment, gearbox 136 includes an input gear assembly 302, an intermediate gear assembly 304, and an output gear assembly 306. Each gear assembly 302, 304, and 306 includes at least two gears. Specifically, input gear assembly 302 includes an input gear 310 and an input step-up gear 312, intermediate gear assembly 304 includes an intermediate gear 314 and an intermediate step-up gear 316, and output gear assembly 306 includes an output gear 318 and an output step-up gear 320. In the exemplary embodiment, an outer diameter and plurality of teeth of each input gear 310, 314, and 318 is greater than an outer diameter and number of teeth of each respective step-up gear 312, 316, and 320. Each input gear 310, 314, and 318 is configured to rotate and engage a portion of step-up gear 312, 316, and 320. Specifically, as each input gear 310, 314, and 318 rotates, so does each associated step-up gear 312, 316, and 320, respectively.

Gearbox 136 also includes various shafts. Specifically, gearbox 136 includes shaft 134. Rotation of shaft 134 drives input gear 310 that subsequently rotates input step-up gear 312. A first output shaft 332 rotatably couples input step-up gear 312 to intermediate gear 314 such that rotation of input step-up gear 312 rotates first output shaft 332 subsequently rotating intermediate gear 314. Shaft 332 receives at least some radial support from at least one bearing 333. Intermediate gear 314 subsequently rotates intermediate step-up gear 316. Similarly, a second output shaft 334 rotatably couples intermediate step-up gear 316 to output gear 318 such that rotation of intermediate step-up gear 316 rotates second output shaft 334 subsequently rotating output gear 318. Shaft 334 receives at least some radial support from at least one bearing 335. Output gear 318 subsequently rotates output step-up gear 320. A third output shaft 336 rotatably couples output step-up gear 320 to shaft 138 such that rotation of output step-up gear 320 rotates third output shaft 336 subsequently rotating shaft 138 facilitating generator 132 production of electrical power. Shaft 336 receives at least some radial support from at least one bearing 337. Third output shaft 336 is coupled to high-speed shaft 138 via coupling 140, as described above.

Gears 310, 314, and 318 engage respective gears 312, 316, and 320 via the plurality of teeth formed on a radially outermost portion of gears 310, 312, 314, 316, 318, and 320. Additionally, gears 310, 314, and 318 have a larger circumferential measurement than gears 312, 316, and 320. Therefore, gears 310, 314, and 318 have a first rate of rotation that drives associated gears 312, 316, and 320, respectively, with a second rate of rotation. In the exemplary embodiment, the second rate of rotation is greater than the first rate of rotation. Hence, in the exemplary embodiment, when a rate of rotation of gear 310 is approximately 20 revolutions per minute (rpm), the rate of rotation of gear 320 is approximately 1400 rpm. Thus, a total gearbox step-up ratio of 70:1 is achieved.

Additionally, nacelle 106 includes various bearings coupled to each shaft that facilitate radial support and alignment of their respective shaft. Each shaft includes at least one set of two bearings (not shown). Additionally, nacelle 106 includes a generator inboard bearing 350 and a generator outboard bearing 352. In the exemplary embodiment, bearings 350 and 352 are rotatably coupled to shaft 138.

Generally, system 300 includes a plurality of accelerometers. In the exemplary embodiment, nacelle 106 includes at least six accelerometers including a main bearing accelerometer 360, a first output shaft accelerometer 362, a second output shaft accelerometer 364, a third output shaft accelerometer 366, a generator inboard bearing accelerometer 368, and a generator outboard bearing accelerometer 370. System 300 also includes at least two Keyphasor speed sensors, a low-speed Keyphasor sensor 372 and a high-speed Keyphasor sensor 374. Accelerometer 360 is positioned adjacent to main bearing 152. Accelerometers 362, 364, and 366 are positioned adjacent to bearings 333, 335, and 337, respectively. Accelerometers 368 and 370 are positioned adjacent to bearings 350, and 352, respectively. Accelerometers 360, 362, 364, 366, 368, and 370 measure radial acceleration. "Keyphasor" is a registered trademark of Bently Nevada, Minden, Nev.

Keyphasors 372 and 374 generate electric pulses related to a point on rotating shafts 134 and 138, respectively. Keyphasors 372 and 374 each generate a signal via a transducer (not shown) observing a once-per-revolution event. Keyphasors 372 and 374 are positioned on or near shafts 134 and 138, respectively. Of the six accelerometers 360, 362, 364, 366, 368, and 370, two accelerometers 360 and 362 are associated with Keyphasor 372, and four accelerometers 364, 366, 368, and 370 are associated with Keyphasor 374.

Additionally, accelerometers 360, 362, 364, 366, 368, and 370, and Keyphasors 372 and 374 include sensors configured to collect and transmit data from each accelerometer 360, 362, 364, 366, 368, and 370 to a Decision Support Module (DSM) 380 for a wind power generator. In the exemplary embodiment, DSM 380 is commercially available from General Electric Corporation Bently-Nevada, Minden, Nev. Alternatively, DSM 380 is any suitable apparatus that facilitates operation of system 300 as described herein. Additionally, DSM 380 is electronically coupled to a processor 382.

Processor 382 processes data received from accelerometers 360, 362, 364, 366, 368, and 370 and Keyphasors 372 and 374 via DSM 380. Processor 382 includes at least one processor and a memory (neither shown). As used herein, the term computer is not limited to just those integrated circuits referred to in the art as a computer, but broadly refers to a processor, a microcontroller, a microcomputer, a programmable logic controller (PLC), an application specific integrated circuit, and other programmable circuits, and these terms are used interchangeably herein. In the exemplary embodiment, memory may include, but is not limited to, a computer-readable medium, such as a random access memory (RAM). Alternatively, a floppy disk, a compact disc-read only memory (CD-ROM), a magneto-optical disk (MOD), and/or a digital versatile disc (DVD) may also be used.

Figure 4:
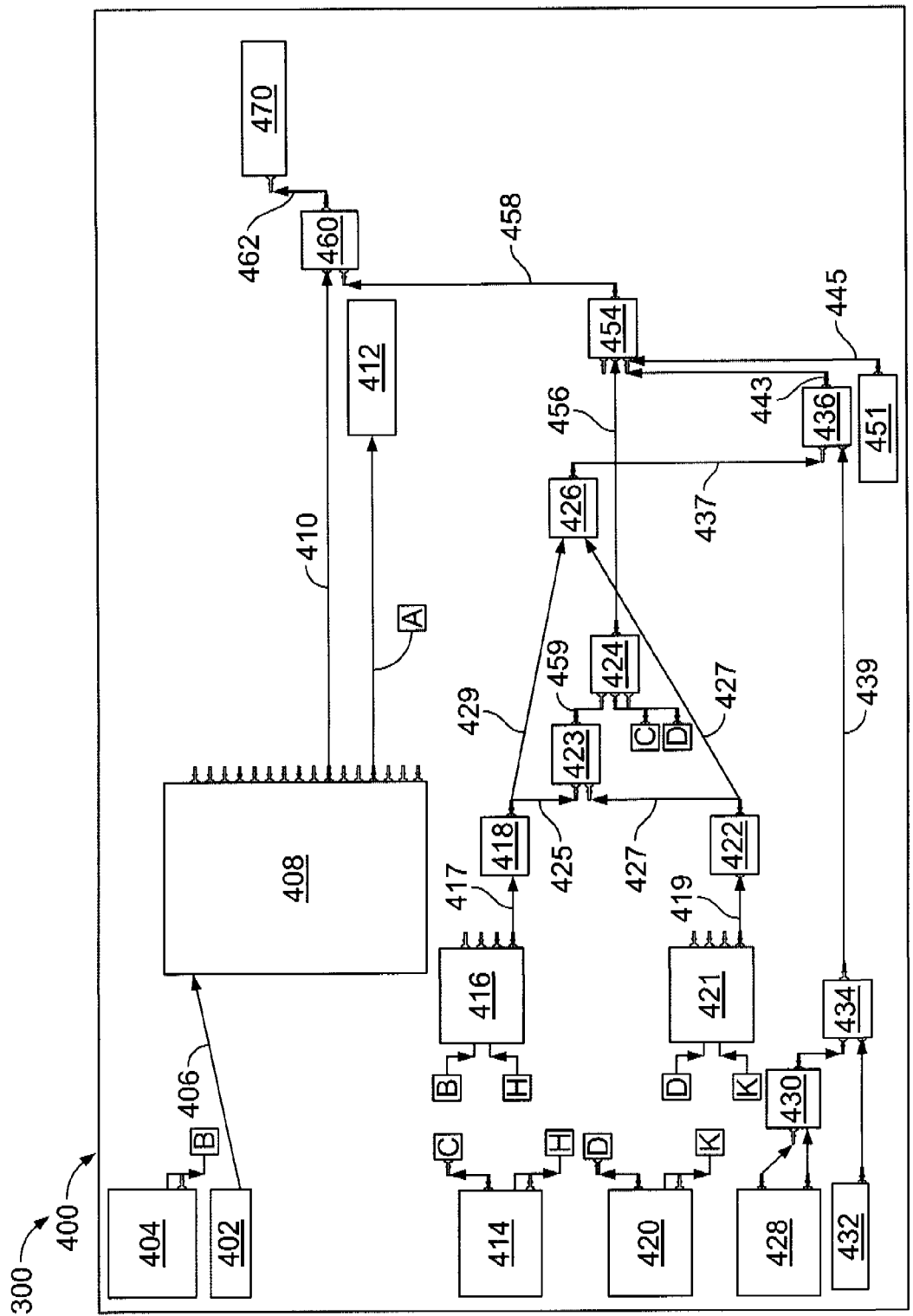
FIG. 4 is a block diagram of an exemplary logic module that may be used with exemplary vibration monitoring system shown in FIG. 3.

FIG. 4 is a block diagram view of an exemplary machine speed and average revolutions per minute (rpm) logic module 400 that may be used with system 300. Typically, system 300 includes one logic module 400 for each of accelerometers 364, 366, 368, and 370. Therefore, logic module 400 receives an input from an accelerometer 402 that includes at least one of accelerometers 364, 366, 368, and 370. Waveform data 406 is collected via accelerometer 402 and is assigned a time stamp via a speed measurement signal time stamp function block 404. Function block 404 outputs a speed measurement time stamp signal B that is transmitted within system 300. Waveform data 406 is transmitted to a waveform data record 408 wherein a start rpm speed measurement signal 410 is transmitted within system 300. Within waveform data record 408, an average rpm calculated speed signal A is determined by summation of a pre-defined number of signals 410 and division of the summation by the pre-defined number of signals 410. Signal A is transmitted from waveform data record 408 to register 412 for further use within system 300.

Logic module 400 also includes a generator speed measurement signal time stamp function block 414 that receives a generator speed measurement signal C from a source (not shown) external to DSM 380 and assigns a generator speed measurement signal time stamp H. For example, a supervisory control and data acquisition system (SCADA) (not shown) coupled in electronic data communication with DSM 380. Signal C and signal H are transmitted for further use within system 300. Logic module 400 also includes a delta time function block 416 that receives signal B and signal H. Signal B and signal H are compared and a time stamp differential signal 417 is generated. Signal 417 is transmitted to an absolute value function block 418 wherein the absolute value of signal 417 is determined and transmitted for later use in logic module 400.

Logic module 400 also includes a high-speed shaft Keyphasor speed measurement signal time stamp function block 420 that receives a high-speed shaft generator speed measurement signal D from Keyphasor 374, and assigns a generator speed measurement signal time stamp K. Signal D and signal K are transmitted for further use within system 300. Logic module 400 also includes a delta time function block 421 that receives signal D and signal K. Similarly, signal D and signal K are compared and a time stamp differential signal 419 is generated. Signal 419 is transmitted to an absolute value function block 422 wherein the absolute value of signal 419 is determined and transmitted for later use in logic module 400.

Function block 418 transmits a signal 425 to a less than function block 423. Similarly, function block 422 transmits a signal 427 to function block 423. Function block 423 determines the smaller of signals 425 and 427, and transmits a selection signal 459 to a switch function block 424. Function block 424 selects either signal C or signal D based on signal 429. For example, if signal 425 represents a smaller time differential than signal 427, signal C is selected by function block 424. Moreover, signal 425 and signal 427 are transmitted to a minimum value selection function block 426 for further use within logic module 400.

Predetermined temporal values are configured within system 300. For example, a maximum time differential is configured within a maximum time delta function block 428, such that a time stamp is applied to the maximum time differential and a signal is transmitted to a unit conversion function block 430. The maximum time differential is an operand that is manually configured by an operator. The maximum time differential value configured within function block 428 is typically selected to facilitate the diagnostic features of system 300 as is discussed further below. Function block 430 converts the signal to units of seconds and transmits the converted signal to an auto-switch function block 434 to be further used in logic module 400. Function block 434 receives the signal from function block 430 and receives a number constant from a number constant register 432. Register 432 maintains an operator-defined time value. Function block 434 transmits the operator-defined temporal value maintained within register 432 in the event that the maximum time differential is not configured within function block 428 as discussed above.

Logic module 400 also includes a less than function block 436 that receives an output signal 437 from function block 426 and an output signal 439 from function block 434. Function block 436 determines the smaller of signals 437 and 439, and transmits a selection signal 443 to a switch function block 454. In the exemplary embodiment, number constant register 451 maintains a predetermined temporal value of zero. In the event that signal 437 exceeds signal 439, a signal 445 transmits to a switch function block 454 to block a signal 456 transmitted from function block 424. Subsequently, in the exemplary embodiment, a value of zero propagates to switch function block 454. In the event that signal 437 is less than signal 439, signal 456 is transmitted through switch function block 454. Switch function block 454 receives signal 456, which includes either signal C or signal D or the value zero from register 451. Switch function block 454 then transmits a signal 458.

Logic module 400 also includes an auto-switch 460 that receives signals 410 and 458, and transmits a signal 462 to a machine speed register 470 for further use within system 300.

In operation, logic module 400, generally, transmits signal 410 via auto-switch 460 to register 470. The value in machine speed register 470 is used within system 300 to process and analyze waveform data 406. Therefore, the preferred value within register 470 is signal 410 (i.e., start rpm speed measurement signal 410). In the event that signal 410 is unavailable, a substitute signal 458 is transmitted into register 470. Substitute signal 458 includes at least one of signal C, signal D, or the value zero. The use of value zero within register 470 precludes analysis and processing of waveform data 406 even though continued data collection for subsequent activities that include, but are not limited to, manual review and analysis, is permitted. Therefore, signals C and D are preferred over the value of zero to facilitate processing and analyzing waveform data 406.

Figure 5:
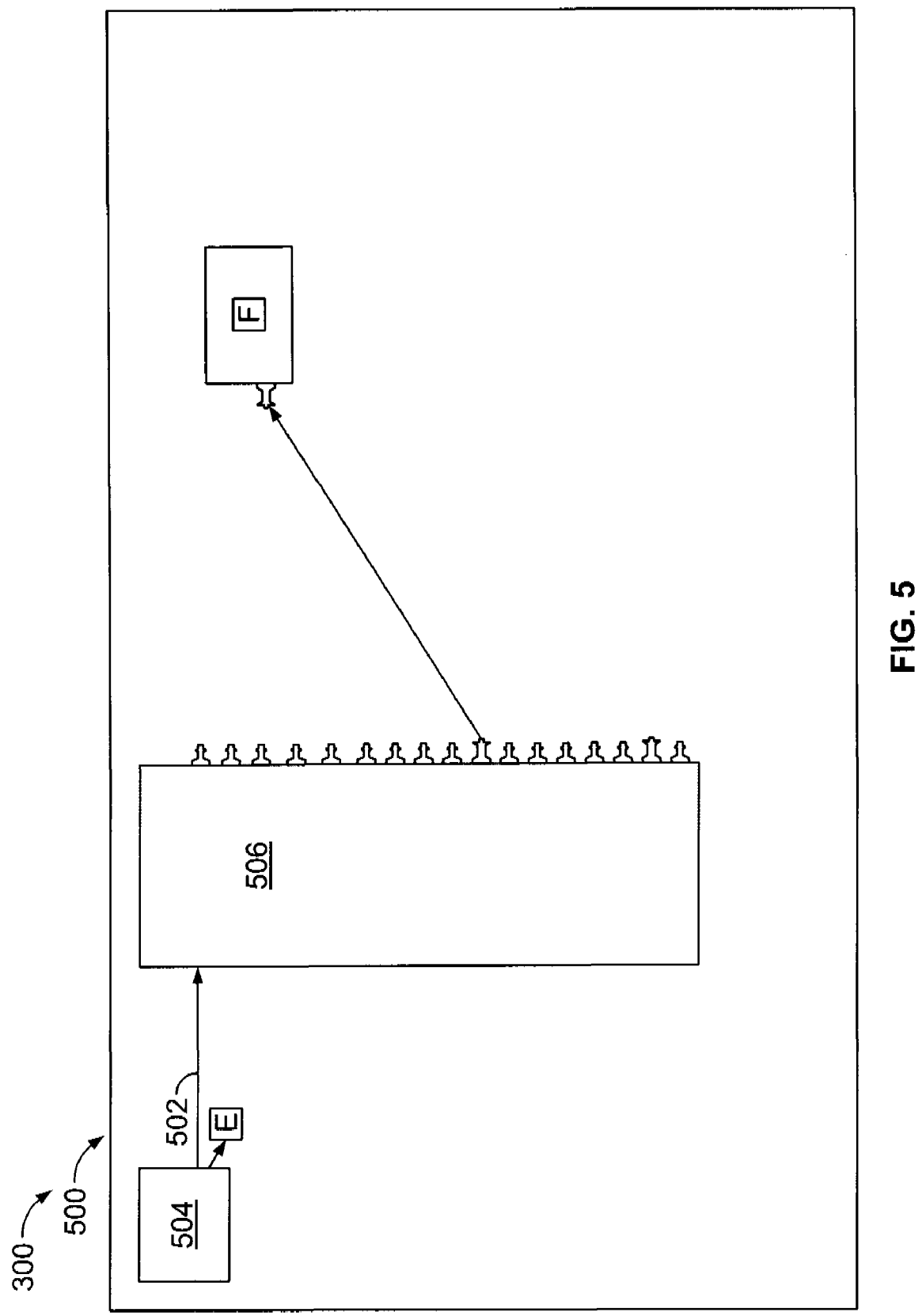
FIG. 5 is a block diagram of an alternative embodiment of an exemplary logic module that may be used with exemplary vibration monitoring system shown in FIG. 3.

FIG. 5 is a block diagram view of an exemplary first output shaft speed logic module 500 that may be used with system 300. Logic module 500 receives the first output shaft accelerometer 362 signal. Waveform data signal 502 is collected via accelerometer 362 and is assigned a time stamp via a first output speed measurement signal time stamp function block 504. Function block 504 outputs a speed measurement time stamp signal E that is transmitted within system 300. Waveform data signal 502 is transmitted to a waveform data record 506 wherein a start rpm speed measurement signal F is transmitted within system 300. System 300 also includes a main bearing logic module (not shown) that is substantially similar to logic module 500.

In operation, logic module 500 transmits signal 502 to waveform data record 506. Module 500 also transmits signal E elsewhere within system 300. The value in record 506 is used within system 300 to process and analyze signal 502. Therefore, the preferred value within record 506 is signal F (i.e., start rpm speed measurement signal F).

Figure 6:
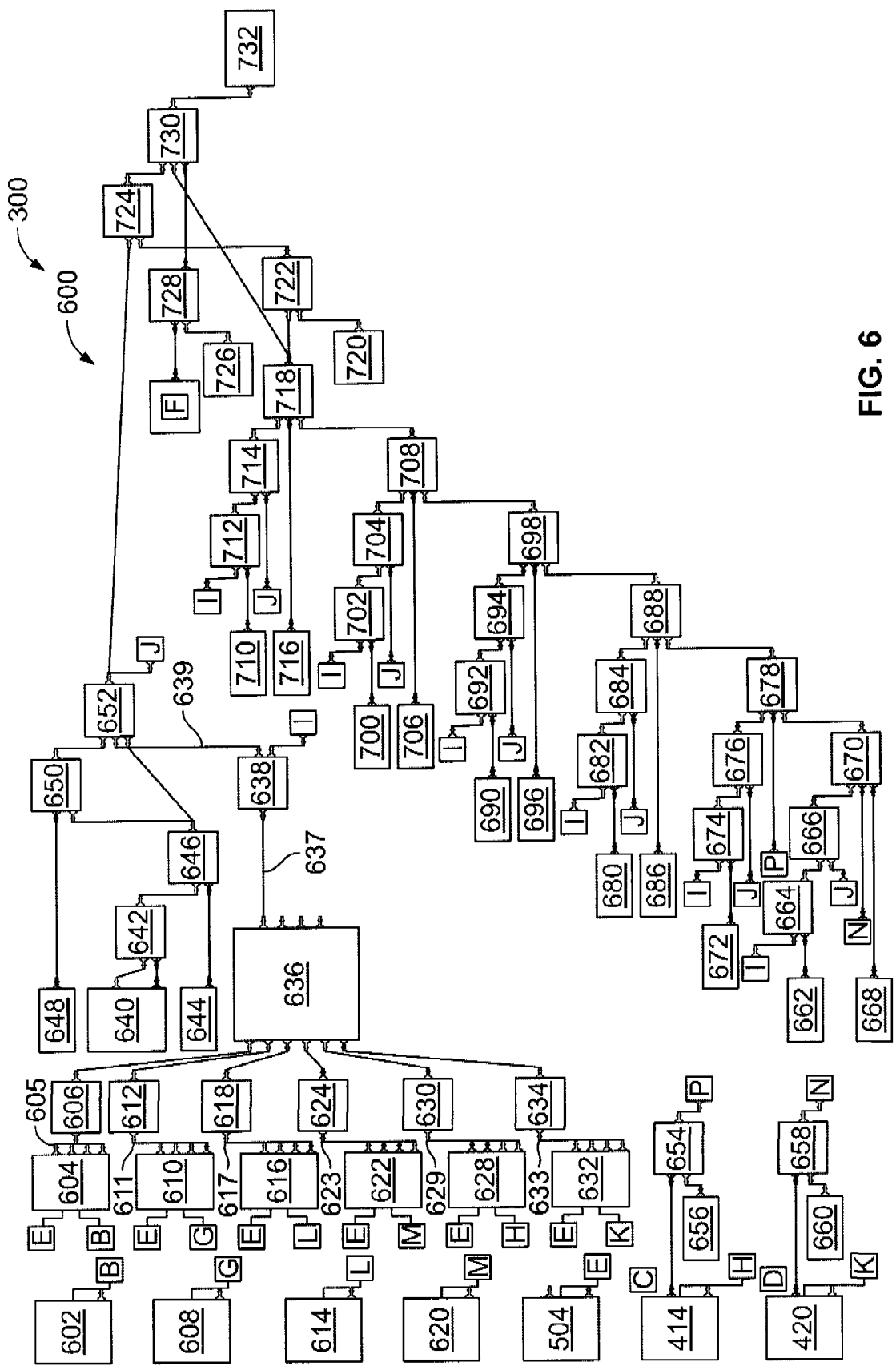
FIG. 6 is a block diagram of an alternative embodiment of an exemplary logic module that may be used with exemplary vibration monitoring system shown in FIG. 3.

FIG. 6 is a block diagram view of an exemplary first output shaft speed prioritization logic module 600 that may be used with system 300. System 300 also includes a main bearing logic module (not shown) that is substantially similar to logic module 600.

Logic module 600 includes a third output shaft speed measurement signal time stamp function block 602. A third output shaft speed measurement signal (not shown) is transmitted to function block 602 from a register 470 (shown in FIG. 4) associated with a logic module 400 that is further associated with accelerometer 336 (shown in FIG. 3). Function block 602 assigns a third output shaft speed measurement signal time stamp B from accelerometer 366. Signal B is transmitted to a delta time function block 604 that receives signal B and signal E (shown in FIG. 5). Signal B and signal E are compared and a time stamp differential signal 605 is generated. Signal 605 is transmitted to an absolute value function block 606 wherein the absolute value of signal 605 is determined and transmitted for later use in logic module 600.

Logic module 600 includes a third output shaft speed measurement signal time stamp function block 608. A second output shaft speed measurement signal (not shown) is transmitted to function block 608 from a register 470 associated with a logic module 400 that is further associated with accelerometer 364 (shown in FIG. 3). Function block 608 assigns a second output shaft speed measurement signal time stamp G from accelerometer 364. Signal G is transmitted to a delta time function block 610 that receives signal G and signal E. Signal G and signal E are compared and a time stamp differential signal 611 is generated. Signal 611 is transmitted to an absolute value function block 612 wherein the absolute value of signal 611 is determined and transmitted for later use in logic module 600.

Logic module 600 includes a generator inboard bearing speed measurement signal time stamp function block 614. A generator inboard bearing speed measurement signal (not shown) is transmitted to function block 614 from a register 470 associated with a logic module 400 that is further associated with accelerometer 368 (shown in FIG. 3). Function block 614 assigns a generator inboard bearing speed measurement signal time stamp L from accelerometer 368. Signal L is transmitted to a delta time function block 616 that receives signal L and signal E. Signal L and signal E are compared and a time stamp differential signal 617 is generated. Signal 617 is transmitted to an absolute value function block 618 wherein the absolute value of signal 617 is determined and transmitted for later use in logic module 600.

Logic module 600 includes a generator outboard bearing speed measurement signal time stamp function block 620. A generator outboard bearing speed measurement signal (not shown) is transmitted to function block 620 from a register 470 associated with a logic module 400 that is further associated with accelerometer 370 (shown in FIG. 3). Function block 620 assigns a generator outboard bearing speed measurement signal time stamp M from accelerometer 370. Signal M is transmitted to a delta time function block 622 that receives signal M and signal E. Signal M and signal E are compared and a time stamp differential signal 623 is generated. Signal 623 is transmitted to an absolute value function block 624 wherein the absolute value of signal 623 is determined and transmitted for later use in logic module 600.

Logic module 600 also includes function block 504 (shown in FIG. 5) that transmits signal E (shown in FIG. 5). Signal E is transmitted to a delta time function block 628 that receives signal E and signal H (shown in FIG. 4). Signal E and signal H are compared and a time stamp differential signal 629 is generated. Signal 629 is transmitted to an absolute value function block 630 wherein the absolute value of signal 629 is determined and transmitted for later use in logic module 600.

Similarly, signal E is transmitted to a delta time function block 632 that receives signal E and signal K (shown in FIG. 4). Signal E and signal K are compared and a time stamp differential signal 633 is generated. Signal 633 is transmitted to an absolute value function block 634 wherein the absolute value of signal 633 is determined and transmitted for later use in logic module 600.

Function blocks 606, 612, 618, 624, 630, and 634 each transmit a signal from each respective function block to a sample buffer 636. Buffer 636 includes a plurality of registers (not shown) that contain time stamp data transmitted from function blocks 606, 612, 618, 624, 630, and 634, and generates a numerical value of 1, 2, 3, 4, 5, and 6, respectively. Buffer 636 transmits a plurality of time stamp signals 637 from the plurality of registers to a minimum value selection function block 638. Function block 638 selects the smallest time stamp value maintained in the plurality of registers, and transmits a sample buffer time stamp register number signal I with a numerical value of 1, 2, 3, 4, 5, or 6, and a sample buffer time stamp value signal 639 for further use within logic module 600.

Logic module 600 includes at least one predetermined temporal value. For example, a maximum time differential is configured within a maximum time delta function block 640, such that a time stamp is applied to the maximum time differential and a signal is transmitted to a unit conversion function block 642. The maximum time differential is an operand that is manually configured by an operator. The maximum time differential value configured within function block 640 is typically selected to facilitate the diagnostic features of system 300 as is discussed further below. Function block 642 converts the signal to units of seconds and transmits the converted signal to an auto-switch function block 646 to be further used in logic module 600. Function block 646 receives the signal from function block 642 and receives a number constant from a number constant register 644. Register 644 maintains an operator-defined temporal value. Function block 646 transmits the operator-defined temporal value maintained within register 644 in the event that the maximum time differential is not configured within function block 640 as discussed above.

Logic module 600 also includes a multiplication function block 650 that receives a signal from function block 646 and a number from a number constant register 648. Logic module 600 also includes a between function block 652 that receives signal 639 and the outputs of function blocks 646 and 650. In the exemplary embodiment, register 648 contains a value of negative one such that function block 650 generates and transmits a negative value of the output of auto-switch function block 646 to function block 652. Therefore, function block 652 is configured to only transmit sample buffer time stamp value signals within a range of plus and minus the value within register 644. Such transmission is indicative of sample buffer 636 containing at least one valid sample. Moreover, when sample buffer 636 contains at least one valid sample that is transmitted by function block 652, a discrete yes-signal J is transmitted from function block 652 for further use within system 300. Furthermore, when sample buffer 636 does not contain at least one valid sample that is transmitted by function block 652, a discrete no-signal J is transmitted from function block 652 for further use within system 300.

Logic module 600 also includes an auto-switch function block 654 that receives signal C from function block 414 (shown in FIG. 4), and a value from a number constant register 656. Register 656 contains a value pre-defined by an operator. Function block 654 selects and transmits a generator speed signal P that is either the operator defined value or signal C for later use in logic module 600.

Logic module 600 also includes an auto-switch function block 658 that receives signal D from function block 420 (shown in FIG. 4), and a value from a number constant register 660. Register 660 contains a value pre-defined by an operator. Function block 658 selects and transmits a high-speed shaft Keyphasor speed signal N that is either the operator defined value or signal D for later use in logic module 600.

Logic module 600 includes an equals logic function block 664 that receives signal I and a value from a number constant register 662. In the exemplary embodiment, the value in register 662 is the numeral 6. Function block 664 also transmits a discrete output signal that equals a yes-signal when signal I and the value of register 662 are equal, i.e., both equal 6. Alternatively, if signal I and the number from register 662 are not equal, i.e., signal I does not equal 6, function block 664 outputs a no-signal. Logic module 600 also includes an and-logic function block 666 that receives the yes-signals and the no-signals from function block 664, and signal J. Function block 666 also transmits a discrete output that includes either a yes-signal or a no-signal. A yes-signal is generated by function block 666 in the event that it receives a yes-signal from function block 664 and a yes-signal J from function block 652. A no-signal is generated by function block 666 in the event that it receives a no-signal from function block 664 or a no-signal J from function block 652. Logic module 600 also includes a switch function block 670 that receives the output of function block 666. Function block 670 receives signal N and a number value from a number constant register 668. Function block 670 transmits either signal N or the value of the output of register 668. When the output of function block 666 is a yes-signal, signal N is transmitted through function block 670 for further use within logic module 600. When the output of function block 666 is a no-signal, the value contained within register 668 is transmitted through function block 670 for further use within logic module 600. In the exemplary embodiment, a value of zero is placed in register 668.

Logic module 600 includes an equals logic function block 674 that receives signal I and a value from a number constant register 672. In the exemplary embodiment, the value in register 672 is the numeral 5. Function block 674 is transmits a discrete output signal that equals a yes-signal when signal I and the value of register 672 are equal, i.e., both equal 5. Alternatively, if signal I and the number from register 672 are not equal, i.e., signal I does not equal 5, function block 674 output is a no-signal. Logic module 600 also includes an and-logic-function block 676 that receives the yes-signals and the no-signals from function block 674, and signal J. Function block 676 also transmits a discrete output that includes either a yes-signal or a no-signal. A yes-signal is generated by function block 676 in the event that it receives a yes-signal from function block 674 and a yes-signal J from function block 652. A no-signal is generated by function block 676 in the event that it receives a no-signal from function block 674 or a no-signal J from function block 652. Logic module 600 also includes a switch function block 678 that receives the output of function block 676. Function block 678 also receives signal P and the output of function block 670. Function block 678 transmits either signal P or the output of function block 670. When the output of function block 676 is a yes-signal, signal P is transmitted through function block 678 for further use within logic module 600. When the output of function block 670 is a no-signal, the output of function block 670 is transmitted through function block 678 for further use within logic module 600.

Logic module 600 includes an equals logic function block 682 that receives signal I and a value from a number constant register 680. In the exemplary embodiment, the value in register 680 is the numeral 4. Function block 682 transmits a discrete output signal that equals a yes-signal when signal I and the value of register 680 are equal, i.e., both equal 4. Alternatively, if signal I and the number from register 662 are not equal, i.e., signal I does not equal 4, function block 682 output is a no-signal. Logic module 600 also includes an and-logic-function block 684 that receives the yes-signals and the no-signals from function block 682, and signal J. Function block 684 also transmits a discrete output that includes either a yes-signal or a no-signal. A yes-signal is generated by function block 684 in the event that it receives a yes-signal from function block 682 and a yes signal J from function block 652. A no-signal is generated by function block 684 in the event that it receives a no-signal from function block 682 or a no-signal J from function block 652.

Logic module 600 also includes a switch function block 688 that receives the output of function block 684. Function block 688 also receives a generator outboard bearing average rpm calculated speed signal 686, Function block 688 transmits either signal 686 or the output signal of function block 678. When the output of function block 684 is a yes-signal, signal 686 is transmitted through function block 688 for further use within logic module 600. When the output of function block 684 is a no-signal, the output of function block 678 is transmitted through function block 688 for further use within logic module 600.

Logic module 600 includes an equals logic function block 692 that receives signal I and a value from a number constant register 690. In the exemplary embodiment, the value in register 690 is the numeral 3. Function block 692 transmits a discrete output signal that equals a yes-signal when signal I and the value of register 690 are equal, i.e., both equal 3. Alternatively, if signal I and the number from register 690 are not equal, i.e., signal I does not equal 3, function block 692 output is a no-signal. Logic module 600 also includes an and-logic-function block 694 that receives the yes-signals and the no-signals from function block 692, and signal J. Function block 694 also transmits a discrete output that includes either a yes-signal or a no-signal. A yes-signal is generated by function block 694 in the event that it receives a yes-signal from function block 692 and a yes-signal J from function block 652. A no-signal is generated by function block 694 in the event that it receives a no-signal from function block 692 or a no-signal J from function block 652. Logic module 600 also includes a switch function block 698 that receives the output of function block 694. Function block 698 also receives a generator inboard bearing average rpm calculated speed signal 696. Function block 698 transmits either signal 696 or the output signal of function block 688. When the output of function block 694 is a yes-signal, signal 696 is transmitted through function block 698 for further use within logic module 600. When the output of function block 694 is a no-signal, the output of function block 688 is transmitted through function block 698 for further use within logic module 600.

Logic module 600 includes an equals logic function block 702 that receives signal I and a value from a number constant register 700. In the exemplary embodiment, the value in register 700 is the numeral 2. Function block 702 transmits a discrete output signal that equals a yes-signal when signal I and the value of register 700 are equal, i.e., both equal 2. Alternatively, if signal I and the number from register 700 are not equal, i.e., signal I does not equal 2, function block 702 output is a no-signal. Logic module 600 also includes an and-logic-function block 704 that receives the yes-signals and the no-signals from function block 702, and signal J. Function block 704 also transmits a discrete output that includes either a yes-signal or a no-signal. A yes-signal is generated by function block 704 in the event that it receives a yes-signal from function block 702 and a yes-signal J from function block 652. A no-signal is generated by function block 704 in the event that it receives a no-signal from function block 702 or a no-signal J from function block 652. Logic module 600 also includes a switch function block 708 that receives the output of function block 704. Function block 708 also receives a second output shaft average rpm calculated speed signal 706. Function block 708 transmits either signal 706 or the output signal of function block 698. When the output of function block 704 is a yes-signal, signal 706 is transmitted through function block 708 for further use within logic module 600. When the output of function block 704 is a no-signal, the output of function block 698 is transmitted through function block 708 for further use within logic module 600.

Logic module 600 includes an equals logic function block 712 that receives signal I and a value from a number constant register 710. In the exemplary embodiment, the value in register 710 is the numeral 1. Function block 712 transmits a discrete output signal that equals a yes-signal when signal I and the value of register 710 are equal, i.e., both equal 1. Alternatively, if signal I and the number from register 710 are not equal, i.e., signal I does not equal 1, function block 712 output is a no-signal. Logic module 600 also includes an and-logic-function block 714 that receives the yes-signals and the no-signals from function block 712, and signal J. Function block 714 also transmits a discrete output that includes either a yes-signal or a no-signal. A yes-signal is generated by function block 714 in the event that it receives a yes-signal from function block 712 and a yes-signal J from function block 652. A no-signal is generated by function block 714 in the event that it receives a no-signal from function block 712 or a no-signal J from function block 652. Logic module 600 also includes a switch function block 718 that receives the output of function block 714. Function block 718 also receives a third output shaft average rpm calculated speed signal 716. Function block 718 transmits either signal 716 or the output signal of function block 708. When the output of function block 714 is a yes-signal, signal 716 is transmitted through function block 718 for further use within logic module 600. When the output of function block 704 is a no-signal, the output of function block 708 is transmitted through function block 718 for further use within logic module 600.

Logic module 600 also includes a not-equals logic function block 722 that receives the output of function block 718 and a value from a number constant register 720 that contains an operator defined value. Logic module 600 also includes an and-logic function block 724 that receives a signal from function block 722 and receives signal J from function block 652. In the event that the output of function block 718 does not equal the value contained in register 720, a discrete yes-signal is transmitted from function block 722 to function block 724. In the event that the output of function block 718 does equal the value contained in register 720, a discrete no-signal is transmitted from function block 722 to function block 724. In the exemplary embodiment, the value in register 720 is zero. In the event that function block 724 receives a yes-signal from function block 722 and a yes-signal J from function block 652, a discrete yes-signal is transmitted to a switch function block 730. In the event that function block 724 receives a no-signal from function block 722 or a no-signal J from function block 652, a discrete no-signal is transmitted to function block 730.

Logic module 600 also includes a multiplication function block 728 that receives signal F and a value from a total gearbox ratio constant register 726. Function block 728 is further configured to multiply signal F by a pre-defined value within register 726 and to transmit an output signal to function block 730. Function block 730 also receives an output signal from function block 718. In the event that function block 730 receives a yes-signal from function block 724, the output signal of function block 718 is transmitted as a machine speed for first output shaft register 732. In the event that function block 730 receives a no-signal from function block 724, the output signal of function block 728 is transmitted as a machine speed to register 732.

In operation, function block 602, generally, transmits signal B to function block 604. Function block 504 transmits signal E to function block 604. Signal B and signal E are compared and time stamp differential signal 605 is generated. Signal 605 is the difference between signal B and signal E. Signal 605 is transmitted to function block 606 wherein the absolute value of signal 605 is determined. Absolute value of signal 605 is then transmitted into a "value 1" register (not shown) within sample buffer 636 for temporary storage.

Similarly, function block 608, generally, transmits signal G to function block 610. Function block 504 transmits signal E to function block 610. Signal G and signal E are compared and time stamp differential signal 611 is generated. Signal 611 is the difference between signal G and signal E. Signal 611 is transmitted to function block 612 wherein the absolute value of signal 611 is determined. Absolute value of signal 611 is then transmitted into a "value 2" register (not shown) within sample buffer 636 for temporary storage.

Similarly, function block 614, generally, transmits signal L to function block 616. Function block 504 transmits signal E to function block 616. Signal L and signal E are compared and time stamp differential signal 617 is generated. Signal 617 is the difference between signal L and signal E. Signal 617 is transmitted to function block 618 wherein the absolute value of signal 617 is determined. Absolute value of signal 617 is then transmitted into a "value 3" register (not shown) within sample buffer 636 for temporary storage.

Similarly, function block 620, generally, transmits signal M to function block 622. Function block 504 transmits signal E to function block 622. Signal M and signal E are compared and time stamp differential signal 623 is generated. Signal 623 is the difference between signal M and signal E. Signal 623 is transmitted to function block 624 wherein the absolute value of signal 623 is determined. Absolute value of signal 623 is then transmitted into a "value 4" register (not shown) within sample buffer 636 for temporary storage.

Similarly, function block 414, generally, transmits signal C to auto switch function block 654 wherein signal C is compared to a value maintained in register 656. Either signal C or the pre-defined value in register 656 is transmitted as signal P from auto switch function block 654 to function block 678 for use described further below. Function block 414 also generates signal H and transmits signal H to function block 628. Signal H and signal E are compared and time stamp differential signal 629 is generated. Signal 629 is the difference between signal H and signal E. Signal 629 is transmitted to function block 630 wherein the absolute value of signal 629 is determined. Absolute value of signal 629 is then transmitted into a "value 5" register (not shown) within sample buffer 636 for temporary storage.

Similarly, function block 420, generally, transmits signal D to auto switch 658 wherein signal D is compared to a value maintained in register 660. Either signal D or the pre-defined value in register 660 is transmitted as signal N from auto switch 658 to function block 670 for use described further below. Function block 420 also generates signal K and transmits signal K to function block 632. Signal K and signal E are compared and time stamp differential signal 633 is generated. Signal 633 is the difference between signal K and signal E. Signal 633 is transmitted to function block 634 wherein the absolute value of signal 633 is determined. Absolute value of signal 633 is then transmitted into a "value 6" register (not shown) within sample buffer 636 for temporary storage.

Signals B, G, L, M, E, H, and K are generated and transmitted as described above in a random order. Therefore, the registers within sample buffer 636 corresponding to "value 1", "value 2", "value 3", "value 4", "value 5", and "value 6" are populated within respective signals randomly as well. Function block 638 facilitates transmission of the lowest value of "value 1" through "value 6" (i.e., the most recent time stamp signal). Sample buffer 636 transmits signal I to function blocks 664, 674, 682, 692, 702, and 712 for use as described later.

Function block 640, function block 642, function 646, registers 644 and 648, and function block 650 cooperate to generate a signal of a pre-determined range of time stamp values that is transmitted to function block 652. Function block 652 receives signal 639 that is transmitted from function block 638, and determines if the value associated with signal 639 is within the aforementioned pre-determined range. If the value is within the pre-determined range, discrete signal J is transmitted to function blocks 666, 676, 684, 694, 704, 714, and 724 as described further below.

Signal I is received by function block 664 wherein signal I is compared to the numeral 6 within register 662. The numeral 6 corresponds to the register containing "value 6" within sample buffer 636. If signal I does not correspond to the numeral 6, a no-signal is transmitted to function block 666. If signal I corresponds to the numeral 6, a yes-signal is transmitted to function block 666. If the value of signal 639 is within the pre-determined range as described above, a discrete signal J that includes a yes-signal is transmitted to function block 666.

Otherwise, a discrete signal J that includes a no-signal is transmitted to function block 666. In the event that function block 666 receives at least one discrete no-signal, a no-signal is transmitted to function block 670, and a signal with the numerical value of zero, as contained in register 668, is transmitted from function block 670 to function block 678. In the event that function block 666 receives two discrete yes-signals, a yes-signal is transmitted to function block 670, and function block 670 transmits signal N to function block 678.

Similarly, signal I is received by function block 674 wherein signal I is compared to the numeral 5 within register 672. The numeral 5 corresponds to the register containing "value 5" within sample buffer 636. If signal I does not correspond to the numeral 5, a no-signal is transmitted to function block 676. If signal I corresponds to the numeral 5, a yes-signal is transmitted to function block 676. If the value of signal 639 is within the pre-determined range as described above, a discrete signal J that includes a yes-signal is transmitted to function block 676. Otherwise, a discrete signal J that includes a no-signal is transmitted to function block 676. In the event that function block 676 receives at least one discrete no-signal, a no-signal is transmitted to function block 678, and the signal that is transmitted from function block 670 (i.e., either zero or signal N) as described above is transmitted through function block 678 to function block 688. In the event that function block 676 receives two discrete yes-signals, a yes-signal is transmitted to function block 678, and function block 678 transmits signal P to function block 688.

Similarly, signal I is received by function block 682 wherein signal I is compared to the numeral 4 within register 680. The numeral 4 corresponds to the register containing "value 4" within sample buffer 636. If signal I does not correspond to the numeral 4, a no-signal is transmitted to function block 684. If signal I corresponds to the numeral 4, a yes-signal is transmitted to function block 684. If the value of signal 639 is within the predetermined range as described above, a discrete signal J that includes a yes-signal is transmitted to function block 684. Otherwise, a discrete signal J that includes a no-signal is transmitted to function block 684. In the event that function block 684 receives at least one discrete no-signal, a no-signal is transmitted to function block 688, and the signal that is transmitted from function block 678 (i.e., either zero, signal N or signal P) as described above is transmitted through function block 688 to function block 698. In the event that function block 684 receives two discrete yes-signals, a yes-signal is transmitted to function block 688, and function block 688 transmits a signal equivalent to the value of signal 686 (i.e., generator outboard bearing average rpm calculated speed signal) to function block 698. Signal 686 is equivalent to a signal A transmitted from register 412

(both shown in FIG. 4) associated with a logic module 400 that is further associated with high-speed accelerator 370. Average rpm signal 686 is used within module 600 since low-speed accelerometers 360 and 362 typically generate less accurate speed signals as a function of the lower rotational speed of shafts 134 and 332 as compared to the higher rotational speed of shafts 334, 336, and 138. Therefore, a signal including an average value of outputs from accelerometer 370 typically facilitates a more accurate determination of shaft 138 rotational speed as compared to any calculated shaft 138 speed signals from accelerometers 360 and 362.

Similarly, signal I is received by function block 692 wherein signal I is compared to the numeral 3 within register 690. The numeral 3 corresponds to the register containing "value 3" within sample buffer 636. If signal I does not correspond to the numeral 3, a no-signal is transmitted to function block 694. If signal I corresponds to the numeral 3, a yes-signal is transmitted to function block 694. If the value of signal 639 is within the pre-determined range as described above, a discrete signal J that includes a yes-signal is transmitted to function block 694. Otherwise, a discrete signal J that includes a no-signal is transmitted to function block 694. In the event that function block 694 receives at least one discrete no-signal, a no-signal is transmitted to function block 698, and the signal that is transmitted from function block 688 (i.e., either zero, signal N, signal P, or generator outboard bearing average rpm calculated speed signal) as described above is transmitted through function block 698 to function block 708. In the event that function block 694 receives two discrete yes-signals, a yes-signal is transmitted to function block 698, and function block 698 transmits a signal equivalent to the value of signal 696 (i.e., generator inboard bearing average rpm calculated speed signal) to function block 708. Signal 696 is equivalent to a signal A transmitted from register 412 associated with a logic module 400 that is further associated with high-speed accelerator 368. Average rpm signal 696 is used within module 600 since low-speed accelerometers 360 and 362 typically generate less accurate speed signals as a function of the lower rotational speed of shafts 134 and 332 as compared to the higher rotational speed of shafts 334, 336, and 138. Therefore, a signal including an average value of outputs from accelerometer 368 typically facilitates a more accurate determination of shaft 138 rotational speed as compared to any calculated shaft 138 speed signals from accelerometers 360 and 362.

Similarly, signal I is received by function block 702 wherein signal I is compared to the numeral 2 within register 700. The numeral 2 corresponds to the register containing "value 2" within sample buffer 636. If signal I does not correspond to the numeral 2, a no-signal is transmitted to function block 704. If signal I corresponds to the numeral 2, a yes-signal is transmitted to function block 704. If the value of signal 639 is within the predetermined range as described above, a discrete signal J that includes a yes-signal is transmitted to function block 704. Otherwise, a discrete signal J that includes a no-signal is transmitted to function block 704. In the event that function block 704 receives at least one discrete no-signal, a no-signal is transmitted to function block 708, and the signal that is transmitted from function block 698 (i.e., either zero, signal N, signal P, generator outboard bearing average rpm calculated speed signal or generator inboard bearing average rpm calculated speed signal) as described above is transmitted through function block 708 to function block 718. In the event that function block 704 receives two discrete yes-signals, a yes-signal is transmitted to function block 708, and function block 708 transmits a signal equivalent to the value of signal 706 (i.e., second output shaft average rpm calculated speed signal) to function block 718. Signal 706 is equivalent to a signal A transmitted from register 412 associated with a logic module 400 that is further associated with high-speed accelerator 364. Average rpm signal 706 is used within module 600 since low-speed accelerometers 360 and 362 typically generate less accurate speed signals as a function of the lower rotational speed of shafts 134 and 332 as compared to the higher rotational speed of shafts 334, 336, and 138. Therefore, a signal including an average value of outputs from accelerometer 364 typically facilitates a more accurate determination of shaft 138 rotational speed as compared to any calculated shaft 138 speed signals from accelerometers 360 and 362.

Similarly, signal I is received by function block 712 wherein signal I is compared to the numeral 1 within register 710. The numeral 1 corresponds to the register containing "value 1" within sample buffer 636. If signal I does not correspond to the numeral 1, a no-signal is transmitted to function block 714. If signal I corresponds to the numeral 1, a yes-signal is transmitted to function block 714. If the value of signal 639 is within the pre-determined range as described above, a discrete signal J that includes a yes-signal is transmitted to function block 714. Otherwise, a discrete signal J that includes a no-signal is transmitted to function block 714. In the event that function block 714 receives at least one discrete no-signal, a no-signal is transmitted to function block 718, and the signal that is transmitted from function block 708 (i.e., either zero, signal N, signal P, generator outboard bearing average rpm calculated speed signal, generator inboard bearing average rpm calculated speed signal or second output shaft average rpm calculated speed signal) as described above is transmitted through function block 718 to function blocks 722 and 730. In the event that function block 714 receives two discrete yes-signals, a yes-signal is transmitted to function block 718, and function block 718 transmits a signal equivalent to the value of signal 716 (i.e., third output shaft average rpm calculated speed signal) to function blocks 722 and 730. Signal 716 is equivalent to a signal A transmitted from register 412 associated with a logic module 400 that is further associated with high-speed accelerator 366. Average rpm signal 716 is used within module 600 since low-speed accelerometers 360 and 362 typically generate less accurate speed signals as a function of the lower rotational speed of shafts 134 and 332 as compared to the higher rotational speed of shafts 334, 336, and 138. Therefore, a signal including an average value of outputs from accelerometer 366 typically facilitates a more accurate determination of shaft 138 rotational speed as compared to any calculated shaft 138 speed signals from accelerometers 360 and 362.

Function block 722 receives the signal transmitted from function block 718 as described above and function block 722 determines if the value from function block 718 is equal or not equal to a pre-determined numerical value contained within register 720. In the exemplary embodiment, register 720 contains the numerical value of zero. If the values are not equal (i.e., the number received from function block 718 is not the numerical value of zero that originated within register 668), a discrete yes-signal is transmitted to function block 724. Otherwise, if the values are equal, a discrete no-signal is transmitted to function block 724. If all of the time stamp values contained within the six registers within sample buffer 636 exceed the pre-determined range, the numerical value of zero originating in register 668 will propagate up to function block 722. The numerical value of zero is not used to determine a machine speed for diagnostic purposes. In contrast, function block 728 multiplies signal F by the numerical value contained within register 726 to determine an approximate rotational speed of shaft 138 that is transmitted to function block 730. If function block 724 receives at least one discrete no-signal, the approximate rotational speed of shaft 138 is transmitted to register 732 to determine the machine speed for diagnostic purposes.

The method and apparatus for operating a wind turbine generator as described herein facilitate operation of a wind turbine generator. More specifically, the vibration monitoring system as described above facilitates an efficient and effective electric power production scheme. Moreover, the vibration monitoring system facilitates decreasing the errors of accuracy of individual wind turbine generator component vibration measurements, and subsequently, component vibration analyses may be made with increased confidence. Such system therefore facilitates reliability of the associated wind turbine generator.

Exemplary embodiments of vibration monitoring systems as associated with wind turbine generators are described above in detail. The methods, apparatus and systems are not limited to the specific embodiments described herein nor to the specific illustrated vibration monitoring system.

While the invention has been described in terms of various specific embodiments, those skilled in the art will recognize that the invention can be practiced with modification within the spirit and scope of the claims.

What is claimed is:

1. A monitoring system for a machine including at least one movable member comprising:
   at least one sensor configured to generate at least one speed measurement signal of the moveable member; and
   at least one processor coupled in data communication to said sensor, said at least one processor is configured to generate a plurality of time-stamped speed measurement signals of the at least one moveable member, said processor is further configured to determine a prioritization of the plurality of time-stamped speed measurement signals as a function of at least one predetermined temporal value.

2. A system in accordance with claim 1 wherein said at least one sensor comprises at least one accelerometer and at least one speed sensor.

3. A system in accordance with claim 1 wherein said at least one processor is configured to generate at least one of:
   a start revolution per minute (rpm) time-stamped speed measurement signal;
   an average rpm time-stamped speed measurement signal;
   a moveable member time-stamped speed measurement signal;
   a high-speed Keyphasor time-stamped speed measurement signal; and
   a low-speed Keyphasor time-stamped speed measurement signal.

4. A system in accordance with claim 3 wherein said at least one processor is configured to transmit a moving member speed signal that substantially equals zero whenever a value of at least one of a start rpm time-stamped speed measurement signal, a high-speed Keyphasor time-stamped speed measurement signal, and a movable member time-stamped speed measurement signal exceeds at least one predetermined temporal value.

5. A system in accordance with claim 1 wherein said at least one processor is further configured to generate a calculated moving member speed signal using at least one pre-defined algorithm.

6. A system in accordance with claim 5 wherein said at least one processor is configured to generate the calculated moving member speed signal when at least one time-stamped value exceeds at least one predetermined temporal value.

7. A system in accordance with claim 1 wherein said at least one processor is further configured to:
   receive a plurality of speed measurement signals from said at least one sensor;
   assign a time stamp value to each of the plurality of speed measurement signals to generate the plurality of time-stamped speed measurement signals;
   determine a prioritization of the plurality of time-stamped speed measurement signals; and
   transmit at least one prioritized time-stamped speed measurement signal.

* * * * *